United States Patent
Zuo et al.

(10) Patent No.: US 12,303,082 B2
(45) Date of Patent: May 20, 2025

(54) AUTONOMOUS CLEANING DEVICE, METHOD FOR TRAVEL CONTROL FOR AUTONOMOUS CLEANING DEVICE, AND STORAGE MEDIUM

(71) Applicants: Beijing Shunzao Technology Co., Ltd., Beijing (CN); BEIJING XIAOMI MOBILE SOFTWARE CO., LTD., Beijing (CN)

(72) Inventors: Yongcheng Zuo, Beijing (CN); Cheng Tang, Beijing (CN); Fei Duan, Beijing (CN); Liang Zhong, Beijing (CN); Shan Gao, Beijing (CN); Tiantian Zhang, Beijing (CN)

(73) Assignees: Beijing Shunzao Technology Co., Ltd., Beijing (CN); BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/709,312

(22) Filed: Mar. 30, 2022

(65) Prior Publication Data
US 2023/0009863 A1    Jan. 12, 2023

(30) Foreign Application Priority Data
Jul. 12, 2021   (CN) .......................... 202110785700.6

(51) Int. Cl.
| | |
|---|---|
| A47L 11/40 | (2006.01) |
| A47L 9/00 | (2006.01) |
| A47L 9/28 | (2006.01) |
| A47L 11/00 | (2006.01) |
| G05D 1/00 | (2024.01) |

(52) U.S. Cl.
CPC .......... *A47L 11/4011* (2013.01); *A47L 9/009* (2013.01); *A47L 9/2805* (2013.01); *A47L 9/2815* (2013.01);
(Continued)

(58) Field of Classification Search
CPC ...... A47L 9/2805; A47L 9/009; A47L 9/2852; A47L 2201/04; A47L 9/2815;
(Continued)

(56) References Cited

U.S. PATENT DOCUMENTS

| | | | |
|---|---|---|---|
| 2016/0235270 A1* | 8/2016 | Santini | A47L 11/4041 |
| 2019/0120633 A1* | 4/2019 | Afrouzi | G05D 1/228 |

(Continued)

FOREIGN PATENT DOCUMENTS

| | | | |
|---|---|---|---|
| CN | 111090277 A | * 5/2020 | .............. A47L 11/24 |
| CN | 112137509 A | * 12/2020 | |

(Continued)

OTHER PUBLICATIONS

Velodyne LIDAR Reference, Nov. 16, 2023, Velodyne LIDAR, (https://velodynelidar.com/what-is-lidar/) (Year: 2023).*

(Continued)

*Primary Examiner* — Eric W Golightly
*Assistant Examiner* — Richard Z. Zhang
(74) *Attorney, Agent, or Firm* — Arch & Lake LLP

(57) ABSTRACT

An autonomous cleaning device, a method of control the autonomous cleaning device, and a storage medium are provided. The device includes a body, and a cleaning assembly, a driving assembly, wheels, a plurality of detection sensors and a controller on the body. The plurality of detection sensors are configured to transmit detection signals and receive reflection data of the detection signals reflected by an obstacle. The controller is configured to obtain reflection data reflected by the obstacle and received by the plurality of detection sensors, determine whether the obstacle has a gap according to the reflection data received by the detection sensors, and in response to the obstacle having the gap, control the autonomous cleaning device to travel, by sending control instructions to driving assembly, (Continued)

according to the reflection data at different time points and basic information of the autonomous cleaning device.

8 Claims, 4 Drawing Sheets

(52) U.S. Cl.
CPC ............. *A47L 9/2852* (2013.01); *A47L 11/00* (2013.01); *A47L 11/4002* (2013.01); *A47L 11/4061* (2013.01); *G05D 1/024* (2013.01); *A47L 2201/04* (2013.01)

(58) Field of Classification Search
CPC .. A47L 11/00; A47L 11/4002; A47L 11/4011; A47L 11/4061; G05D 1/024; G05D 2201/0215; G05D 1/0088; G05D 1/0214; G05D 1/0238; G05D 2201/0203
See application file for complete search history.

(56) References Cited

U.S. PATENT DOCUMENTS

2019/0246857 A1* 8/2019 Baek .................... A47L 9/0477
2020/0069134 A1* 3/2020 Ebrahimi Afrouzi .................
                                                               A47L 9/0472
2020/0125103 A1* 4/2020 Li ......................... G01S 17/931
2022/0061616 A1* 3/2022 Yoon ................... A47L 11/4061

FOREIGN PATENT DOCUMENTS

| CN | 112327878 A | | 2/2021 |
|---|---|---|---|
| CN | 112733571 A | * | 4/2021 |
| CN | 212932959 U | * | 4/2021 |
| CN | 113455962 A | | 10/2021 |
| KR | 20210010274 A | * | 1/2021 |
| WO | WO-2020114019 A1 | * | 6/2020 .......... B25J 11/0085 |

OTHER PUBLICATIONS

CN-111090277-A Written Description (Year: 2020).*
CN-212932959-U Written Description (Year: 2021).*
WO 2020114019 A1 Written Description (Year: 2020).*
The Extended European Search Report of Application No. 22168455.8 dated on Jun. 17, 2022,(7p).
First Office Action issued to Chinese Application No. 202110785700.6 dated Feb. 21, 2022 with English translation, (15p).

* cited by examiner

AUTONOMOUS CLEANING DEVICE, METHOD FOR TRAVEL CONTROL FOR AUTONOMOUS CLEANING DEVICE, AND STORAGE MEDIUM

CROSS REFERENCE TO RELATED APPLICATION

This application is based on and claims priority to Chinese patent application No. 202110785700.6, filed on Jul. 12, 2021, the entire content of which is hereby incorporated into this application by reference for all purposes.

FIELD

The present disclosure relates to the field of cleaning technologies, and more particularly to an autonomous cleaning device, a method of travel control for an autonomous cleaning device, and a storage medium.

BACKGROUND

When cleaning some areas such as houses and offices, an autonomous cleaning device is generally used to suck dust or foreign objects when traveling. The existing autonomous cleaning device detects an obstacle in front side corresponding to a traveling path through obstacle detection sensors, and avoids the detected obstacle.

SUMMARY

According to a first aspect, the present disclosure provides an autonomous cleaning device. The device includes a body, and a cleaning assembly, a driving assembly, a plurality of detection sensors and a controller disposed on the body. The cleaning assembly is configured to clean a surface to be cleaned. The driving assembly is configured to drive the autonomous cleaning device to move. The plurality of detection sensors are configured to transmit detection signals and receive reflection data, and the reflection data includes the detection signals reflected by an obstacle. The controller, coupled in communication with the plurality of detection sensors and the driving assembly, is configured to: obtain reflection data reflected by the obstacle and received by the plurality of detection sensors; determine whether the obstacle has a gap according to the reflection data received by the detection sensors; in response to determining that the obstacle has the gap, control the autonomous cleaning device to move, by sending control instructions to the driving assembly, according to the reflection data at different time points and basic information of the autonomous cleaning device.

According to a second aspect, the present disclosure provides a method of travel control for an autonomous cleaning device. The method includes: in response to determining that fields of view of a plurality of detection sensors on the autonomous cleaning device satisfies a preset first threshold, obtaining reflection data reflected by an obstacle and received by the detection sensors; determining whether the obstacle has a gap according to the reflection data reflected by the detection sensors; in response to determining that the obstacle has the gap, controlling the autonomous cleaning device to move according to the reflection data at different time points and basic information of the autonomous cleaning device.

According to a third aspect, the present disclosure provides a non-transitory computer readable storage medium having a computer program stored thereon, for execution by a controller to implement a method of travel control for an autonomous cleaning device. The method includes: in response to determining that fields of view of a plurality of detection sensors on the autonomous cleaning device satisfies a preset first threshold, obtaining reflection data reflected by an obstacle and received by the detection sensors; determining whether the obstacle has a gap according to the reflection data reflected by the detection sensors; in response to determining that the obstacle has the gap, controlling the autonomous cleaning device to move according to the reflection data at different time points and basic information of the autonomous cleaning device.

DETAILED DESCRIPTION

In order to better explain the present disclosure and facilitate understanding, the present disclosure is described in detail through specific embodiments in combination with the accompanying drawings.

LIST OF REFERENCE SIGNS

100: body;
200: TOF sensor; 210: transmitting portion; 220: transmitting window; 221: upper edge; 222: left edge; 223: right edge; 224: lower edge; 230: receiving portion; 240: LDS sensor; 250: collision sensing assembly; 260: edge sensor;
300: cleaning assembly; 310: liquid container; 320: main brush frame; 330: edge brush subsystem; 340: dust box assembly; 350: exhaust port.

An autonomous cleaning device in embodiments of the present disclosure may effectively control travelling of the autonomous cleaning device by expanding fields of view of detection sensors, obtaining reflection data reflected by an obstacle, identifying a gap in the obstacle and spatial information of the gap based on the reflection data.

Figure 1:
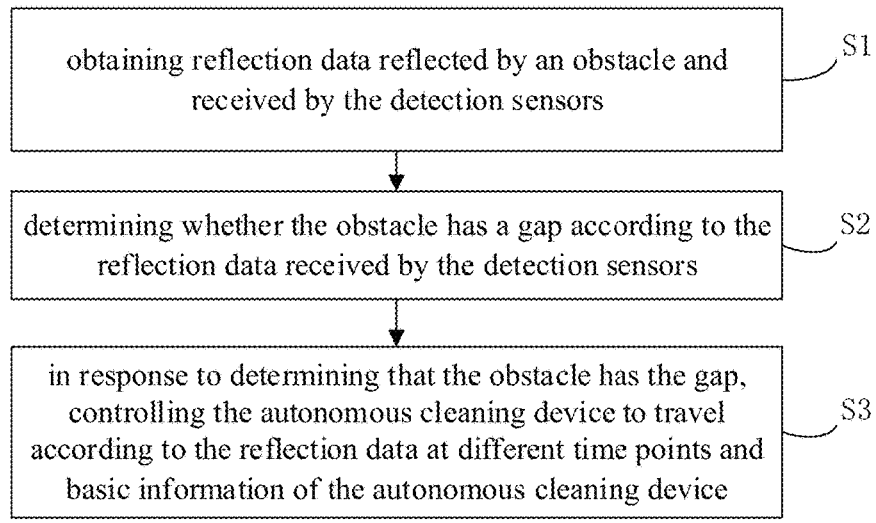
FIG. 1 is a flowchart illustrating a method of travel control for an autonomous cleaning device according to one or more examples of the present disclosure.

FIG. 1 is a flowchart illustrating a method of travel control for an autonomous cleaning device according to an embodiment of the present disclosure. In response to fields of view of a plurality of detection sensors on the autonomous cleaning device satisfying a preset first threshold, the method includes the following: obtaining reflection data reflected by an obstacle and received by the detection sensors, in which the detection sensors may include at least two sensors and may be located at different positions; determining whether the obstacle has a gap according to the reflection data received by different detection sensors; in response to the obstacle having the gap, controlling travel of the autonomous cleaning device according to the reflection data at different time points and basic information of the autonomous cleaning device.

In the present disclosure, with obtaining the reflection data of each detection sensor, it may effectively determine whether the obstacle has the gap. In response to the obstacle having the gap, it may effectively and reasonably determine whether the gap allows the autonomous cleaning device to pass according to a change value between reflection data at adjacent time points, thus effectively avoiding the obstacle by controlling the autonomous cleaning device.

In an implementation, the autonomous cleaning device performs distance measurement and obstacle avoidance operations of the obstacle according to first reflection data and second reflection data reflected by the obstacle currently encountered, which may accurately measure a passable height of the gap or a slit in response to detecting the obstacle with the gap or the slit, thus avoiding the following misjudgments due to inaccurate measurement: the autonomous cleaning device avoiding the gap or slit that would otherwise be passable, and the autonomous cleaning device entering the gap or slit that would otherwise be impassable. Therefore, the problems that a coverage area of the autonomous cleaning device when operating is reduced or the travelling is hindered may be solved. The present disclosure may realize detecting the obstacle in a wide range, and ensure a maximization of an indoor cleaning area under a condition of avoiding the obstacle effectively.

In order to better understand the above technical solution, example embodiments of the present disclosure will be described in more detail below with reference to the accompanying drawings. Although example embodiments of the present disclosure are shown in the accompanying drawings, it should be understood that the present disclosure may be implemented in various forms and should not be limited by the embodiments set forth herein. On the contrary, these embodiments are provided to understand the present disclosure more clearly and thoroughly, and to fully convey the scope of the present disclosure to those skilled in the art.

In detail, the present disclosure provides a method of travel control for an autonomous cleaning device according to an embodiment of the present disclosure. The method may include the following blocks.

At block S1, reflection data reflected by an obstacle and received by a plurality of detection sensors is obtained.

In an embodiment, reflection data reflected by the obstacle and received by at least two detection sensors at different positions is obtained.

The plurality of detection sensors may include a first detection sensor and a second detection sensor at different positions. The block S1 may include:
  obtaining first reflection data reflected by the obstacle and received by the first detection sensor and second reflection data reflected by the obstacle and received by the second detection sensor.

The first detection sensor may include one or more ToF sensors 200, which may detect distance information to the obstacle and object size data within a measurement range. The second detection sensor may include one or more LDS sensors 240, which may determine whether there is an obstacle in front of the autonomous cleaning device and a distance between the autonomous cleaning device and the obstacle, but may not determine a type of the obstacle and a height and a shape of the obstacle.

At block S2, it is determined whether the obstacle has a gap according to the reflection data received by the detection sensors.

In the present disclosure, the slit or the gap is a gap structure between the obstacle and a surface on which the autonomous cleaning device travels, for example, a gap between a bed board and the surface, or a gap between a bottom of a tea table and the surface.

In a case that the plurality of detection sensors include a first detection sensor and a second detection sensor at different positions, the block S2 includes:
  determining whether the first reflection data includes third reflection data, and in response to the first reflection data including the third reflection data, determining that the obstacle has the gap, in which the third reflection data is configured to indicate at least one of width information and height information of the gap;
  determining whether the second reflection data includes fourth reflection data, and in response to the second reflection data including the fourth reflection data, controlling the autonomous cleaning device to stop traveling or avoid the obstacle, in which the fourth reflection data is configured to indicate impassability.

At block S3, in response to the obstacle having the gap, the autonomous cleaning device is controlled to travel according to the reflection data at different time points and basic information of the autonomous cleaning device.

In an embodiment, in response to the obstacle having the gap, the autonomous cleaning device is controlled to travel, by sending control instructions to the driving assembly, according to the reflection data at different time points and basic information of the autonomous cleaning device. The basic information may include a height and a volume of the device.

Figure 2:
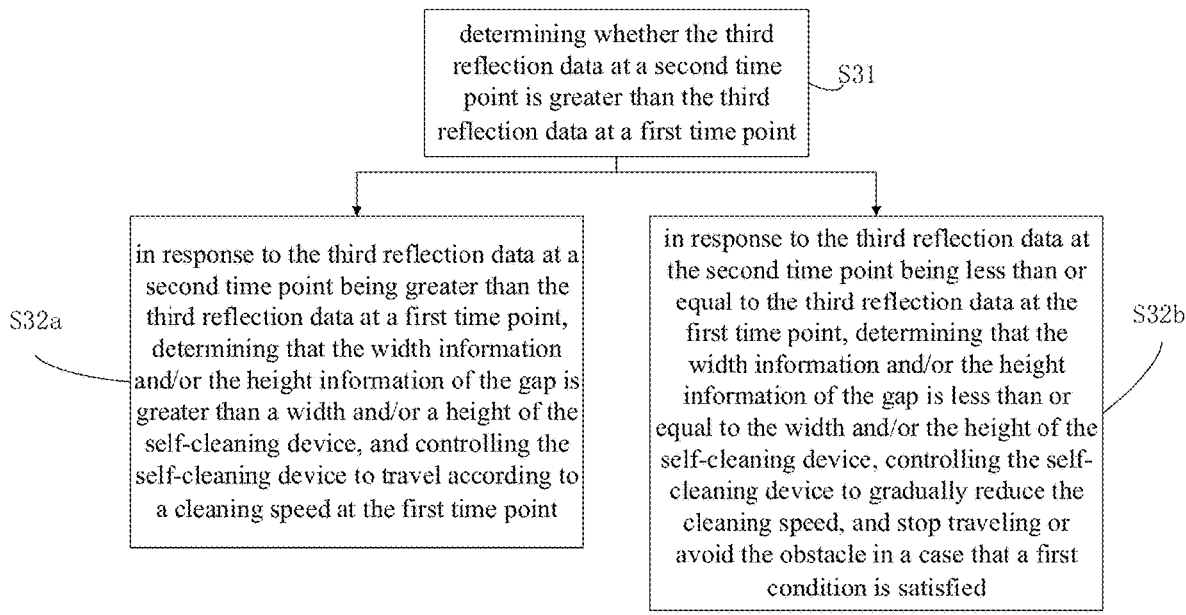
FIG. 2 is a flowchart illustrating a block S3 of a method of travel control for an autonomous cleaning device according to one or more examples of the present disclosure.

FIG. 2 is a flowchart illustrating a block S3 of a method of travel control for an autonomous cleaning device according to an embodiment of the present disclosure. As illustrated in FIG. 2, the block S3 may include the following blocks.

At block S31, it is determined whether third reflection data at a second time point is greater than third reflection data at a first time point.

At block S32a, in response to the third reflection data at the second time point being greater than the third reflection data at the first time point the autonomous cleaning device is controlled to travel according to a cleaning speed at the first time point.

In an embodiment, in response to the third reflection data at the second time point being greater than the third reflection data at the first time point, it is determined that width information of the gap is greater than width of the autonomous cleaning device, or height information of the gap is greater than a height of the autonomous cleaning device, or the width information and the height information of the gap is greater than the width and the height of the autonomous cleaning device respectively, thus the autonomous cleaning device is controlled to travel according to the cleaning speed at the first time point.

At block S32b: in response to the third reflection data at the second time point being less than or equal to the third reflection data at the first time point, the autonomous cleaning device is controlled to gradually reduce the cleaning speed, and stop traveling or avoid the obstacle in a case that a first condition is satisfied.

In an embodiment, in response to the third reflection data at the second time point being less than or equal to the third reflection data at the first time point, it is determined that the width information of the gap is less than or equal to the width of the autonomous cleaning device, or the height information of the gap is less than or equal to the height of the autonomous cleaning device, or the width information and the height information of the gap is less than or equal to the width and the height of the autonomous cleaning device respectively, thus the autonomous cleaning device is controlled to gradually reduce the cleaning speed, and stop traveling or avoid the obstacle in the case that the first condition is satisfied.

The second time point may be later than the first time point. A time interval between the first time point and the second time point may be appropriately selected according to an actual situation of the autonomous cleaning device. The third reflection data may be an electrical signal obtained by processing a reflected optical signal of an optical signal emitted by the ToF sensor 200. Comparing the third reflection data at different times may refer to comparing voltages, currents, data quantities or other appropriate parameters of the electrical signals as long as it may reflect a change trend of the third reflection data at different times.

A method of obstacle avoiding for the autonomous cleaning device may be appropriately selected according to actual requirements. For example, when the first condition is satisfied, the autonomous cleaning device is controlled to swerve and bypass the obstacle along an edge of the obstacle; or the autonomous cleaning device is controlled to move in an opposite direction when the first condition is satisfied.

In some embodiments, the first condition may be: a distance between a highest point of the autonomous cleaning device and a suspended portion of the obstacle having the gap being 0; or, a distance between a foremost end of the autonomous cleaning device and a supporting portion of the obstacle having the gap being 0.

In the above blocks, in a case that the first reflection data includes the third reflection data, and the second reflection data does not include the fourth reflection data, it is indicated that the obstacle detected currently has the gap, but it is required to determine a change value between the third reflection data at adjacent time points, and determine whether the autonomous cleaning device is allowed to pass through according to the change value. In a case that the first reflection data does not include the third reflection data, and the second reflection data includes the fourth reflection data, it is indicated that the obstacle detected currently is impassable. In a case that the first reflection data includes the third reflection data, and the second reflection data includes the fourth reflection data, it is indicated that the first sensor detects the gap of the obstacle, but the second sensor detects that the obstacle is impassable, in other words, it is indicated that the obstacle has the gap, but the autonomous cleaning device is not allowed to pass through the gap.

In an embodiment, a maximum physical height of the autonomous cleaning device is 15 cm. In a case that an actual height of a low obstacle with respect to a surface on which the autonomous cleaning device travels is 14 cm, while a measured height of the low obstacle is 16 cm, since the measured height is higher than the maximum physical height of the autonomous cleaning device, e.g., a physical highest point of the autonomous cleaning device, the autonomous cleaning device may enter the gap, but will be stuck in the gap, causing the autonomous cleaning device to be trapped, and to be rescued by the user, which affects user experiences. In a case that the actual height of the low obstacle with respect to the surface on which the autonomous cleaning device travels is 16 cm, while the measured height of the low obstacle is 14 cm, since the measured height is less than the actual height of the low obstacle with respect to the surface on which the autonomous cleaning device travels, causing the measured height lower than the physical height of the overall autonomous cleaning device, the autonomous cleaning device avoids the gap that would otherwise be passable, a coverage area of the autonomous cleaning device when performing operations is reduced.

Therefore, the above method for controlling the autonomous cleaning device may achieve effective obstacle avoidance on the one hand, and maximize an indoor cleaning area on the other hand.

The present disclosure also provides an autonomous cleaning device, implementing the foregoing method of travel controlling for the autonomous cleaning device. In an embodiment, the autonomous cleaning device may be a cleaning robot, which is configured for sucking foreign objects on a surface, sweeping and mopping the surface. The structure of the autonomous cleaning device includes a body 100, a plurality of detection sensors and a controller both on the body 100, such as a surface of the body 100.

Figure 7:
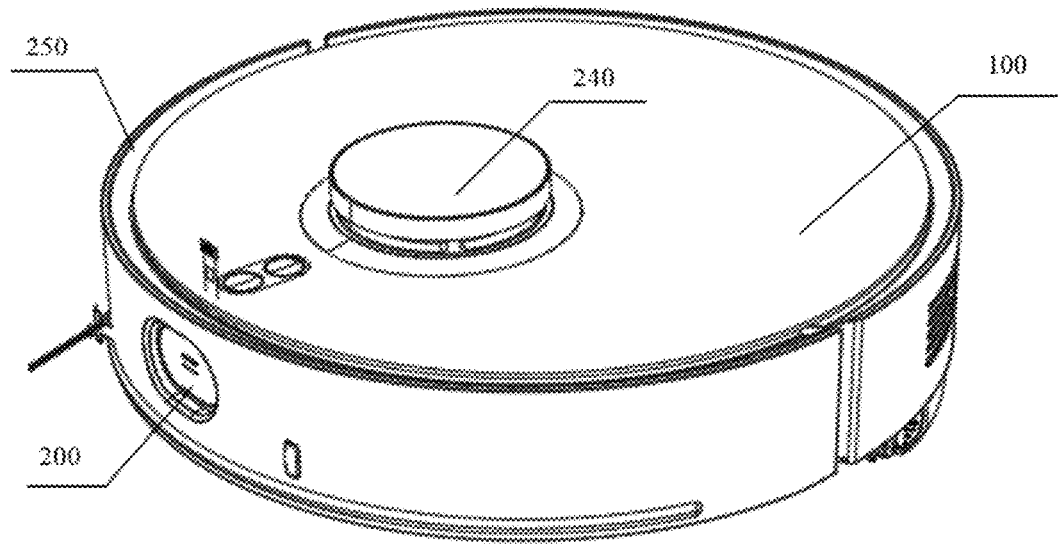
FIG. 7 is a schematic diagram illustrating a structure of an autonomous cleaning device in a third field of view according to one or more examples of the present disclosure.
Figure 8:
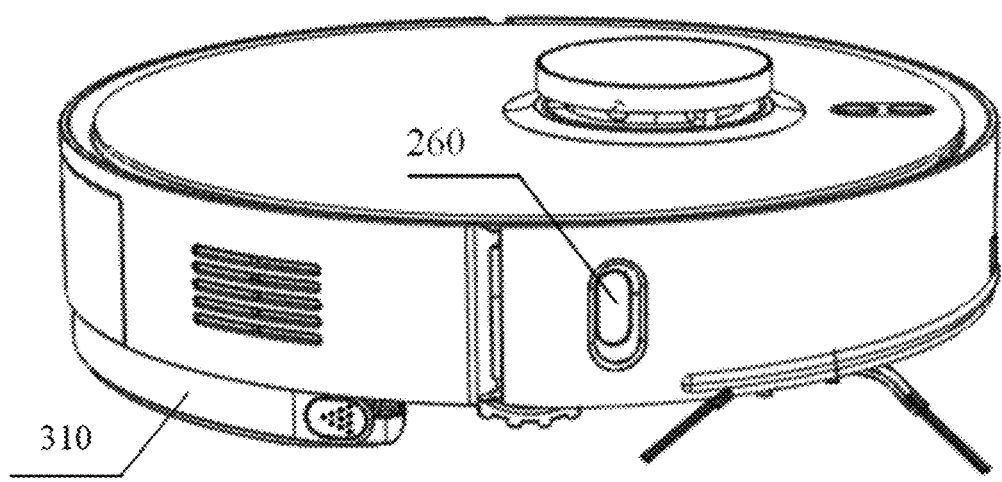
FIG. 8 is a schematic diagram illustrating a structure of an autonomous cleaning device in a fourth field of view according to one or more examples of the present disclosure.

FIG. 7 and FIG. 8 illustrate a structure of an autonomous cleaning device in a third field of view and in a fourth field of view respectively. The body 100 may be on a surface to be cleaned, and the body 100 is approximately circular in shape (i.e., circular at the front and rear), or other shapes, including but not limited to approximately D-shaped shapes with square at the front and circular at the rear. The body 100 may include a frame, a forward portion, a rearward portion, a chassis, and the like.

Figure 3:
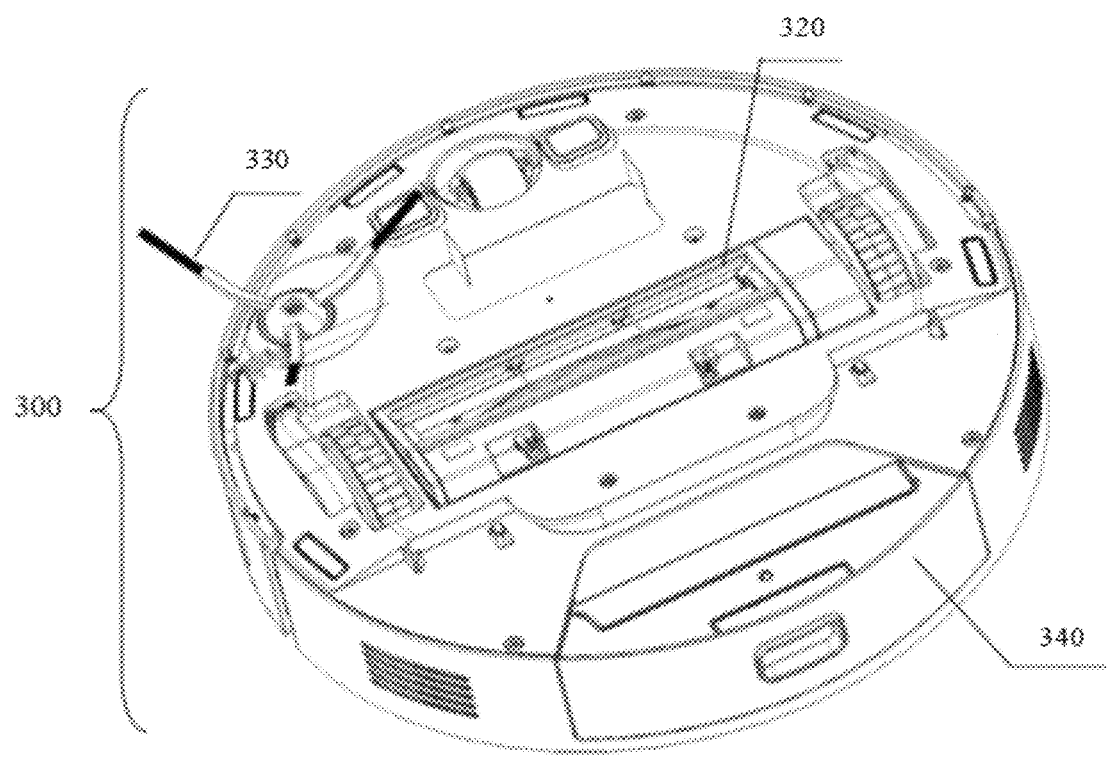
FIG. 3 is a schematic diagram illustrating a structure of an autonomous cleaning device in a first field of view according to one or more examples of the present disclosure.

FIG. 3 is a schematic diagram illustrating a structure of an autonomous cleaning device in a first field of view according to an embodiment of the present disclosure. As illustrated in FIG. 3, the autonomous cleaning device further includes a cleaning assembly 300 on the body 100. The cleaning assembly 300 includes: a first cleaning subassembly configured for cleaning a first preset area of the surface to be cleaned; a second cleaning subassembly configured for cleaning a second preset area of the surface to be cleaned. The first preset area and the second preset area may overlap. The first cleaning subassembly is a wet cleaning subassembly, and is configured to wipe the surface to be cleaned (such as ground) with a cleaning cloth containing cleaning liquid. The second cleaning subassembly is a dry cleaning subassembly, and is configured to sweep solid particle pollutants on the surface to be cleaned through a structure such as a sweeping brush.

Referring to FIG. 3 and in combination with the structure of the autonomous cleaning device in the fourth field of view illustrated in FIG. 8, the first cleaning subassembly includes a liquid container 310 and a cleaning component, the liquid container 310 is configured for storing the cleaning liquid, and the bottom of the liquid container 310 is provided with guide wheels to move cooperating with the drive assembly. The cleaning component is detachably provided at a liquid outlet of the liquid container 310, and is configured for wiping the first preset area after contacting with the cleaning liquid during a cleaning operation. For example, the cleaning component may be a cleaning cloth, and the liquid in the liquid container 310 flows to the cleaning cloth, and the cleaning cloth wipes the ground after the sweeping operation by the sweeping brush (also referred to as a roller brush).

As illustrated in FIG. 3, the second cleaning element includes a cleaning head subsystem and an edge brush subsystem 330. The cleaning head subsystem includes a main brush frame 320, a main brush component installed in combination with the main brush frame 320, and a suction component arranged in combination with the main brush frame 320. The suction component is close to the main brush component. The edge brush subsystem 330 includes an edge brush. The edge brush is connected with a rotating shaft. The rotating shaft is at a certain angle relative to the ground. The edge brush is configured to sweep debris to the second preset area.

Figure 4:
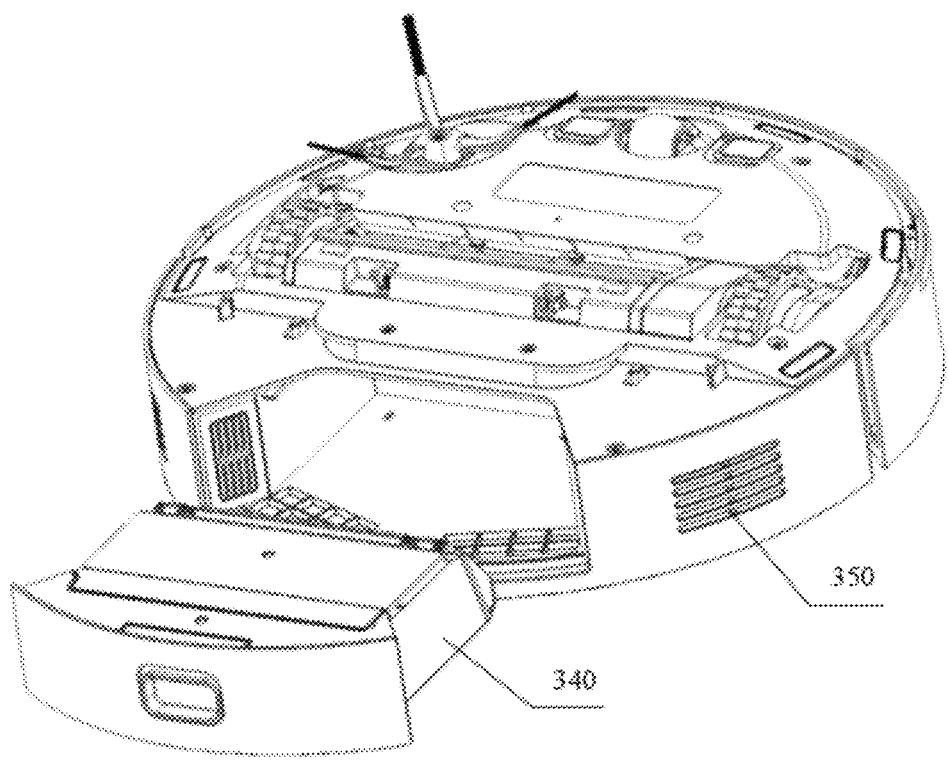
FIG. 4 is a schematic diagram illustrating a structure of an autonomous cleaning device in a second field of view according to one or more examples of the present disclosure.

FIG. 4 is a schematic diagram illustrating a structure of an autonomous cleaning device in a second field of view according to an embodiment of the present disclosure. As illustrated in FIG. 4, the second cleaning subassembly is configured as a dry cleaning subassembly, a cleaning function of which is realized by the roller brush, a dust box assembly 340, a fan (not shown in the figure), an exhaust port 350 and a connecting component between the foregoing four. The dust box assembly 340 is installed in an accommodating cavity at rear of the body of the device using a snap fit through a mechanically pick-up hand. When the pick-up hand is picked up, a snap component retracts in, and when the pick-up hand is released, the snap component stretches out and snaps into a notch in the accommodating cavity for accommodating the snap component. A specific cleaning process of the second cleaning element is as follows: the main brush component that has a certain interference with the ground sweeps the particles on the ground and rolls the particles up to the front of a dust suction port between the main brush component and the dust box assembly 340, and then the particles is sucked into a dust box through gas with suction generated by the fan and passed through the dust box assembly 340. A dust removal ability of the autonomous cleaning device may be characterized by dust pick up efficiency (DPU) of garbage. The dust pick up efficiency DPU is affected by a structure and materials of the main brush, and affected by a wind utilization rate of an air duct composed of the dust suction port, the dust box, the fan, exhaust port and the connecting component between the foregoing four, and affected by a type and power of the fan.

Figure 5:
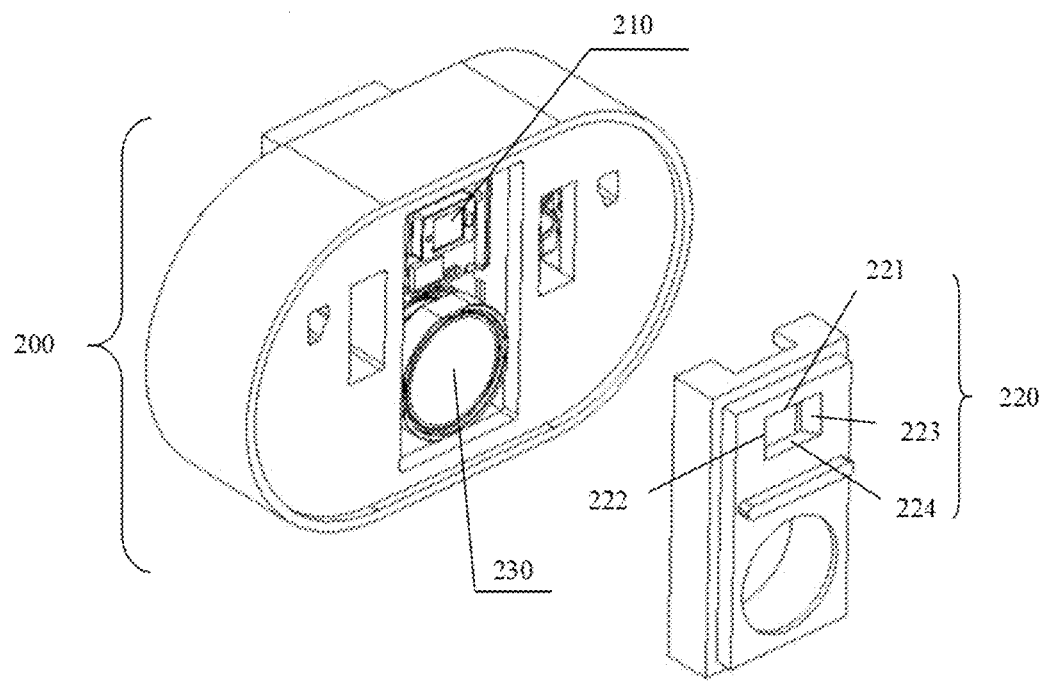
FIG. 5 is a schematic diagram illustrating a structure of a ToF sensor of an autonomous cleaning device in a first field of view according to one or more examples of the present disclosure.

FIG. 5 is a schematic diagram illustrating a structure of a ToF sensor of an autonomous cleaning device in a first field of view according to an embodiment of the present disclosure. As illustrated in FIG. 5, the first detection sensor is on front side of the autonomous cleaning device along a traveling direction of the autonomous cleaning device. The second detection sensor is on a top side of the autonomous cleaning device. The top side is opposite to a bottom side of the autonomous cleaning device which contacts a surface on which the autonomous cleaning device travels. The first detection sensor may include a time of flight (ToF) sensor 200, and the second detection sensor may include a laser distance sensor (LDS) 240. The ToF sensor 200 may determine a distance from the body to the obstacle in front of the body, and object size data within a ToF measurement range, but has a slightly lower accuracy. The LDS sensor 240 may determine whether the obstacle is directly in front of the LDS sensor, and the distance from the body to the obstacle, but fail to determine the type of the obstacle and the height and the shape of the obstacle. The number of the ToF sensors and the number of the LDS sensors may be appropriately selected according to usage requirements, for example, one, two, three or even more.

It should be noted that, due to structural requirements of sensor installation, a detection height of the second detection sensor (that is, a distance between a position for emitting a detection signal of the second detection sensor and the surface on which the autonomous cleaning device travels along a vertical direction) is lower than a maximum height of the autonomous cleaning device. When the height of the gap of the obstacle is higher than a height of the second detection sensor and lower than the maximum height of the autonomous cleaning device, the second detection sensor fails to detect that there is an impassable situation in front of the device, and the autonomous cleaning device may continue to travel forward and be stuck in the gap. The method of travel control provided in the present disclosure may accurately detect a height and a width of the gap by the first detection sensor, so as to accurately determine whether the autonomous cleaning device is allowed to pass through, thus avoiding the autonomous cleaning device from being trapped, and improving cleaning efficiency of the autonomous cleaning device.

Figure 6:
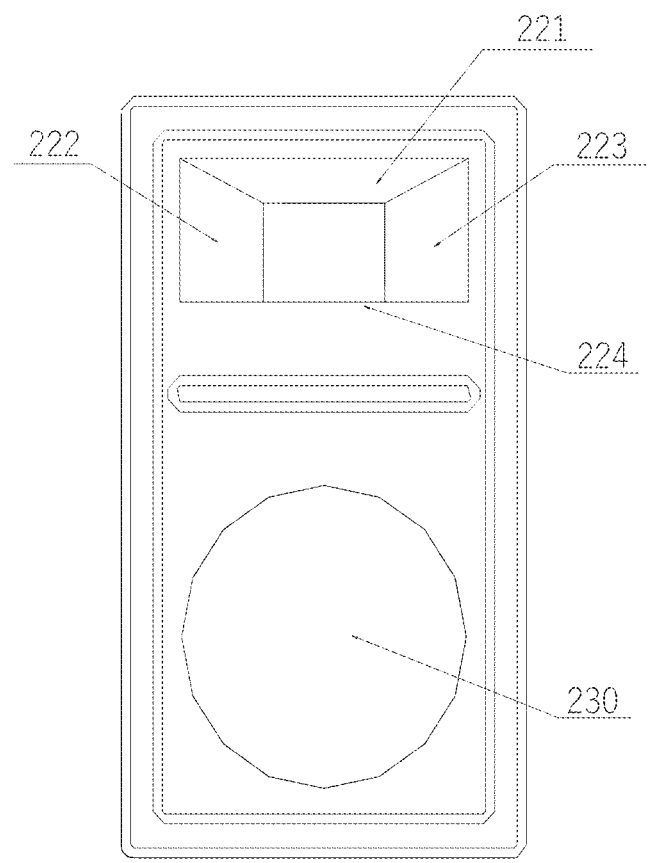
FIG. 6 is a schematic diagram illustrating a cover structure in front of a ToF sensor of an autonomous cleaning device according to one or more examples of the present disclosure.

Referring to FIG. 5, in combination with a cover structure in front of the ToF sensor illustrated in FIG. 6, the ToF sensor 200 includes a transmitting portion 210 and a receiving portion 230. The transmitting portion 210 may be at an area upper a center line at front of the body 100. The receiving portion 230 may be at an area lower the center line at front of the body 100. For example, a field of view of the first detection sensor is greater than or equal to 60 degree in a vertical direction, which may ensure that the first detection sensor has a large enough detection range to obtain obstacle information within a space required by operating the autonomous cleaning device.

As illustrated in FIGS. 5 and 6, the transmitting portion 210 is configured in transmitting window in a shape of a horn. An inclined surface for an upper edge 221 of the transmitting window 220 has an included angle of more than 60 degree with a horizontal surface along. An inclined surface for a left edge 222 and an inclined surface for a right edge 223 of the transmitting window 220 each have an included angle of more than 60 degree with a vertical surface. The vertical surface is parallel to a direction from front to rear of the autonomous cleaning device. An inclined surface for a lower edge 224 of the transmitting window 220 has an included angle of more than 30 degree with the horizontal surface.

As illustrated in FIG. 7 and FIG. 8, a sensing apparatuses includes a collision sensing assembly 250 and an edge sensor 260 both shown in the figures, and a position sensor, a buffer, an infrared sensor, a magnetometer, an accelerometer, a gyroscope and an odometer all not shown in the figures. These sensors provide various position information and motion status information of the machine to a controller. In an embodiment, the position sensors include, but will not limited to, laser transmitters, vision cameras, dynamic vision sensors, and laser distance sensors (LDS). In an example, the position sensors may include the laser transmitter, the vision camera, the dynamic vision sensor and a lidar. The collision sensing assembly 250 may include a strike plate on the front side of the body 100, a collision sensor and a strike plate reset component both on the body 100. The collision sensor may sense a collision timely when the strike plate collides with the obstacle, and send a sensing signal to the controller. The striker plate reset component is configured to apply an elastic reset force to the striker plate to keep the striker plate in an initial position. Once a collision force is less than the elastic reset force for resetting, the striker plate may recover under the action of the elastic reset force to the initial position.

In an embodiment, the autonomous cleaning device further includes a controller, a driving assembly, a power supply assembly and a human-computer interaction assembly, which are on the body 100.

The controller is configured to send control instructions, such as a cleaning instruction or an obstacle avoidance instruction, to the driving assembly according to various position information and motion status information detected by the sensing apparatuses.

The driving assembly includes a left driving component and a right driving component symmetrically arranged along a transverse axis defined by the body 100, and the left driving component and the right driving component both are driven wheels or driving wheels. The driving assembly includes a traveling wheel, a driving motor and a control circuit for controlling the driving motor. The driving assembly may also be connected with a circuit for measuring a driving current and the odometer. The driving assembly is detachably connected to the body 100, which is convenient for disassembly and maintenance. The driving wheels may have a biased drop suspension system fastened to the structure of the body 100 in a movable manner, such as attached in a rotatable manner and a spring bias allowing a bias downward and away from the structure of the body 100. The spring bias allows the drive wheels to maintain contact and traction with the ground with a certain ground force, while a cleaning component (e.g., the roller brush, etc.) of the autonomous cleaning device maintains contact with the ground with a certain pressure. The drive assembly also includes a mecanum wheel.

The power supply assembly is configured to supply power to the cleaning assembly 300, the sensing assembly, the controller, the driving assembly and the human-computer interaction assembly. The power supply assembly includes a battery package, and a charging control circuit, a charging temperature detection circuit and an undervoltage detection circuit, which are connected to the battery package. The battery package includes a lithium battery and a polymer battery. The rechargeable battery may be connected with the charging control circuit, the battery charging temperature detection circuit and the battery undervoltage detection circuit. The charging control circuit, the battery charging temperature detection circuit, and the battery undervoltage detection circuit may be connected with a microcontroller control circuit. The body is charged by connecting with a charging station through charging contacts on a lateral side or below of the body. When the exposed charging contacts are stained with dust, a plastic body around electrodes will be melted and deformed, even the electrodes themselves will be deformed, due to accumulation of electric charges during a charging process, thus resulting in impossible to continue normal charging.

In an example, the autonomous cleaning device is charged by connecting with the charging station through charging electrodes on the lateral side or below of the body. The autonomous cleaning device is provided with a signal receiver at the front end to receive a signal from the charging station, which may be an infrared signal, or a graphic signal in some more advanced technologies. When the autonomous cleaning device departs from the charging station, the system will remember a location of the charging station. Therefore, when the autonomous cleaning device completes the cleaning or an electric quantity of the battery is low, the controller may control the driving assembly to drive the autonomous cleaning device towards the location of the charging station stored in a memory, and then connect the charging station for charging.

The human-computer interaction assembly is configured to display a current operating status or function options or surrounding environment information of the autonomous cleaning device. The human-computer interaction assembly may include function buttons and/or display screens and/or indicator lights and/or speakers. The human-computer interaction assembly may also include Mobile client application. At the same time, the self-cleaning equipment may show a map of the environment where the device is located and the location of the device through the human-computer interaction assembly when moving, which may provide users with more abundant and user-friendly function items.

The front portion of the body 100 may carry a buffer which, during a cleaning operation, detects one or more events in a travelling path of the autonomous cleaning device via a series of triggering principles, such as a light breaking principle. The autonomous cleaning device may control the driving assembly, by events, such as obstacles, walls, detected by the buffer, to enable the autonomous cleaning device to respond to the events such as moving away from the obstacles.

In order to prevent the autonomous cleaning device from entering a forbidden area in home (for example, an area where fragile items are placed, a water-containing ground area such as a toilet), the autonomous cleaning device may also include a forbidden area detector.

The forbidden area detector may include a virtual wall sensor, which is configured to restrict the autonomous cleaning device from crossing a boundary of a preset forbidden area when the virtual wall is detected. The virtual wall sensor may set the virtual wall according to settings of a user to define the forbidden area. When the virtual wall sensor detects the virtual wall, the control may control the driving assembly to restrict the autonomous cleaning device for cleaning from crossing the boundary of the forbidden area (that is, the virtual wall) and entering the forbidden area.

In a process of using the self-cleaning equipment, in order to prevent the autonomous cleaning device from falling on indoor stairs, higher steps, etc., the forbidden area detector may also include a cliff sensor, and the cliff sensor may set a boundary according to settings of the user to define the forbidden area. When the cliff sensor detects the boundary of the forbidden area (that is, an edge of the cliff), the control may control the driving assembly to restrict the autonomous cleaning device for cleaning from crossing the boundary of the forbidden area, thereby preventing the autonomous cleaning device from falling off the steps.

The present disclosure provides a system of travel control for an autonomous cleaning device. The system includes:
- a data obtaining module, configured to obtain reflection data reflected by an obstacle and received by at least two detection sensors at different positions;
- a gap determining module, configured to determine whether the obstacle has a gap according to the reflection data received by different detection sensors;
- a gap travelling module, configured to, in response to the obstacle having the gap, control the autonomous cleaning device to travel according to the reflection data at different time points and basic information of the autonomous cleaning device. The specific control method may refer to the above description.

The system may be arranged on a circuit board within the structure of the body 100, and include a computing processor, such as a central processing unit, an application processor, an application, communicated with a non-transitory memory, such as a hard disk, a flash memory, a random access memory. The processor may draw a real-time map of the environment in which the autonomous cleaning device is located, through positioning algorithms, such as SLAM, based on the obstacle information fed back by the laser distance sensor, and comprehensively determine the current operating state of the autonomous cleaning device, such as crossing a threshold, on a carpet, on the cliff, stuck above or below, dust box being full, Off the ground, etc., based on distance information and speed information fed back by sensing device, such as, the buffer, the cliff sensor and a ultrasonic sensor, the infrared sensor, the laser sensor, the magnetometer, the accelerometer, gyroscope, the odometer. The system may also provide future operation strategies for different situations, to enable the operation of the autonomous cleaning device more in line with requirements of the user, resulting in a better user experience. Further, the system may plan a most efficient and reasonable cleaning path and a cleaning mode based on the real-time map information drawn by the SLAM, which may improve the dust pick up efficiency of the autonomous cleaning device.

The present disclosure provides a computer readable storage medium having a computer program stored thereon, for execution by a controller to implement a method of travel control for an autonomous cleaning device according to the above embodiments.

In summary, the present disclosure provides a method of travel control for an autonomous cleaning device, a device, a system a storage medium. In the solution of the present disclosure, the present disclosure may accurately realize measuring a distance to an obstacle and obstacle avoidance planning based on multiple sets of reflection data reflected by the obstacle, which may reduce obstacle avoidance misoperations, caused by inaccurate measurement of a passable height, avoid the cleaning area being too small or the device being blocked in a corner or a gap. Meanwhile, the autonomous cleaning device disclosed in the present disclosure is provided with the ToF sensor 200 with a wider monitoring range. Because of the wider monitoring range of the ToF sensor 200 the present disclosure is easier to identify the obstacle with a large reflection angle. Therefore, the present disclosure has more application scenes and practicability.

In order to more clearly describe the behavior of the autonomous cleaning device, the following directional definitions are made. The autonomous cleaning device may travel on a surface by various combinations of movements relative to following three perpendicular axes each other defined by the structure of the body 100: a front-to-back axis X (that is, an axis along a direction from the forward portion to the rearward portion of the structure of the body 100), a horizontal axis Y (that is, an axis perpendicular to the axis X and in a same horizontal surface as the axis X) and a central vertical axis Z (an axis perpendicular to a surface formed by the axis X and the axis Y). A forward driving direction along the front-to-rear axis X is designated as "forward" and a rearward driving direction along the front-to-rear axis X is designated as "rear". The horizontal axis Y extends substantially between a right wheel and a left wheel of the autonomous cleaning device along an axis center defined by a center point of the driving wheel assembly.

The autonomous cleaning device may rotate around the Y axis. When the forward portion of the autonomous cleaning device is tilted up and the rearward portion is tilted down, it is designated as "tilt up", and when the forward portion of the autonomous cleaning device is tilted down and the rearward portion is tilted up, it is designated as "tilt down".

In addition, the autonomous cleaning device may be rotated about the Z axis. In the forward direction of the autonomous cleaning device, when the autonomous cleaning device tilts to the right of the X-axis, it is designated as "turn right", and when the autonomous cleaning device tilts to the left of the X-axis, it is it is designated as "turn left".

Since the system/device described in the above embodiment of the present disclosure is the system/device configured to implement the method of the above embodiment of the present disclosure. Those skilled in the art may understand the specific structure and modification of the system/device based on the method described in the above embodiment of the present disclosure, which will not be repeated here. All systems/devices described in the method of the above embodiment of the present disclosure belong to the scope of the present disclosure.

Those skilled in the art will appreciate that embodiments of the present disclosure may be provided as methods, systems, or computer program products. Therefore, the present disclosure may take the form of complete hardware, complete software, or a combination software and hardware. Further, the present disclosure may take the form of a computer program product implemented on one or more computer usable storage media (including but not limited to disk memory, CD-ROM, optical memory, etc.) containing computer usable program codes.

The present disclosure is described with reference to the flow chart and/or block diagram of the method, the device (system) and the computer program product according to the embodiment of the present disclosure. It should be understood that each process and/or block in the flowchart and/or block diagram and the combination of processes and/or blocks in the flowchart and/or block diagram may be realized by computer program instructions.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

It should be noted that in the claims, any reference numeral between brackets should not be understood as a limitation of the claims. The word "comprise" does not exclude the existence of components or steps not listed in the claims. The word "a" or "an" before a component does not exclude the existence of multiple such components. The present disclosure may be realized by means of hardware including several different components and by means of a properly programmed computer. In the claims listing several apparatuses, several of these apparatuses may be embodied by the same hardware. The words, such as, first, second and third, are configured only for convenience of expression and do not indicate any order. These words may be understood as part of a name of component.

In addition, it should be noted that in the description of this specification, the description of the terms "an embodiment", "some embodiments", "embodiments", "examples", "specific examples" or "some examples" refers to that the specific features, structures, materials or characteristics described in combination with the embodiments or examples are included in at least one embodiment or example of the present disclosure. In this specification, the schematic expression of the above terms does not have to be directed to the same embodiments or examples. Moreover, the specific features, structures, materials or characteristics described may be combined in any one or more embodiments or examples in a suitable manner. In addition, without contradiction, those skilled in the art may combine and compose the different embodiments or examples described in this specification and the features of different embodiments or examples.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Although preferred embodiments of the present disclosure have been described, those skilled in the art may make additional changes and modifications to these embodiments after learning the basic inventive concept. Therefore, the claims should be interpreted as all changes and modifications including preferred embodiments and falling within the scope of the present disclosure.

Obviously, those skilled in the art may make various modifications and variants to the present disclosure without departing from the spirit and scope of the present disclosure. Thus, if these modifications and variants of the present disclosure fall within the scope of the claims of the present disclosure and its equivalent technology, the present disclosure should also include these modifications and variants.

What is claimed is:

1. An autonomous cleaning device, comprising a body, a cleaning assembly, a driving assembly, a plurality of detection sensors, and a controller disposed on the body, wherein:
   the cleaning assembly is configured to clean a surface to be cleaned;
   the driving assembly is configured to drive the autonomous cleaning device to move;
   the plurality of detection sensors are configured to transmit detection signals and receive reflection data, and the reflection data comprises detection signals reflected by an obstacle; and
   the controller, coupled with the plurality of detection sensors and the driving assembly, is configured to:
   obtain reflection data reflected by the obstacle and received by the plurality of detection sensors;
   determine whether the obstacle has a gap according to the reflection data received by the detection sensors, wherein the detection sensors comprise a first detection sensor and a second detection sensor, and the first detection sensor comprises a time of flight (ToF) sensor, the ToF sensor is configured to determine a distance between the obstacle and the body, and object size data within a ToF measurement range, the second detection sensor comprises a laser distance sensor (LDS), the LDS is configured to determine absence or presence of the obstacle in front of the body and the distance between the obstacle and the body; and
   in response to determining that the obstacle has the gap, control the autonomous cleaning device to move, by sending control instructions to the driving assembly, according to reflection data of the ToF sensor at different time points and basic information of the autonomous cleaning device;
   the controller is configured to, in response to determining that the obstacle has the gap, determine whether the gap allows the autonomous cleaning device to pass according to a change value between reflection data of the ToF sensor at adjacent time points;
   wherein the controller is configured to: obtain first reflection data reflect by the obstacle and received by the first detection sensor, and obtain second reflection data reflect by the obstacle and received by the second detection sensor; determine that the obstacle has the gap in response to determining that the first reflection data comprises third reflection data, wherein the third reflection data is configured to indicate at least one of width information or height information of the gap; and
   the controller is further configured to: in response to determining that third reflection data at a second time point is greater than third reflection data at a first time point, control the autonomous cleaning device to travel according to a speed same as a cleaning speed at the first time point; and in response to determining that the third reflection data at the second time point is less than or equal to the third reflection data at the first time point, control the autonomous cleaning device to gradually reduce the cleaning speed, and stop traveling or avoid the obstacle in response to determining that a first condition is satisfied; wherein the second time point is later than the first time point.

2. The device according to claim 1, wherein
the controller is configured to:
control the autonomous cleaning device to stop travel or avoid the obstacle in response to determining that the second reflection data comprises fourth reflection data, wherein the fourth reflection data is configured to indicate impassability.

3. The device according to claim 1, wherein the first condition comprises:
a distance between a highest point of the autonomous cleaning device and a suspended portion of the obstacle having the gap is 0.

4. The device according to claim 1, wherein the first condition comprises:
a distance between a foremost end of the autonomous cleaning device and a supporting portion of the obstacle having the gap is 0.

5. The device according to claim 1, wherein,
the first detection sensor is disposed on front side of the autonomous cleaning device along a traveling direction of the autonomous cleaning device;
the second detection sensor is disposed on a top side of the autonomous cleaning device, the top side is opposite to a bottom side of the autonomous cleaning device, and the bottom side of contacts a surface on which the autonomous cleaning device travels.

6. The device according to claim 5, wherein,
the ToF sensor comprises a transmitting portion and a receiving portion, the transmitting portion is disposed above a center line at front of the body, and the receiving portion is disposed below the center line at front of the body.

7. The device according to claim 6, wherein,
a field of view of the first detection sensor is greater than or equal to 60 degrees in a vertical direction.

8. The device according to claim 5, wherein the ToF sensor comprises a transmitting portion and a receiving portion;

the transmitting portion is configured in a transmitting window element, the transmitting window element presents a shape with a gradually decreasing cross-sectional area from one end to another end;

an inclined surface for an upper edge of the transmitting window element has an included angle of more than 60 degrees with a horizontal surface, an inclined surface for a left edge and an inclined surface for a right edge of the transmitting window element each has an included angle of more than 60 degrees with a vertical surface, the vertical surface is parallel to a direction from front to rear of the autonomous cleaning device, and an inclined surface for a lower edge of the transmitting window element has an included angle of more than 30 degrees with the horizontal surface.

\* \* \* \* \*